United States Patent
Abdelhameed et al.

(10) Patent No.: US 11,968,107 B2
(45) Date of Patent: Apr. 23, 2024

(54) DETERMINING CORRECTNESS OF ACTUALLY RECEIVED TIMESTAMP

(71) Applicant: Bayerische Motoren Werke Aktiengesellschaft, Munich (DE)

(72) Inventors: Mohamed-Saad Abdelhameed, Dachau (DE); Manjeet Singh Bilra, Hoerlkofen (DE); Karl Budweiser, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 18/027,762

(22) PCT Filed: Aug. 26, 2021

(86) PCT No.: PCT/EP2021/073566
§ 371 (c)(1),
(2) Date: Mar. 22, 2023

(87) PCT Pub. No.: WO2022/063514
PCT Pub. Date: Mar. 31, 2022

(65) Prior Publication Data
US 2023/0353469 A1    Nov. 2, 2023

(30) Foreign Application Priority Data
Sep. 23, 2020    (EP) .................................... 20197698

(51) Int. Cl.
*H04L 43/0852*    (2022.01)
*H04L 41/147*    (2022.01)
*H04L 41/149*    (2022.01)

(52) U.S. Cl.
CPC ........ *H04L 43/0852* (2013.01); *H04L 41/147* (2013.01); *H04L 41/149* (2022.05)

(58) Field of Classification Search
CPC .. H04L 43/0852; H04L 41/149; H04L 41/147
See application file for complete search history.

(56) References Cited

U.S. PATENT DOCUMENTS 10,023,164 B2 * 7/2018 Schwindt ................ B60T 8/885
2012/0226965 A1 * 9/2012 Hammerschmidt ........................
G06F 11/1004
714/E11.032

(Continued)

FOREIGN PATENT DOCUMENTS

WO    WO 20185/047510 A1    3/2018
WO    WO 2019/001929 A1    1/2019

OTHER PUBLICATIONS

International Search Report (PCT/ISA/210) issued in PCT Application No. PCT/EP2021/073566 dated Mar. 10, 2022 (six (6) pages).

(Continued)

*Primary Examiner* — Blake J Rubin
(74) *Attorney, Agent, or Firm* — Crowell & Moring LLP

(57) ABSTRACT

A method for determining a correctness of an actually received timestamp is provided. A communication network includes a master clock, a first ECU having a first slave clock, a validator having a second slave clock, and a first communication bus. The first ECU uses a first communication standard having a deterministic scheme. The method includes synchronizing, at the first ECU, a time of the first slave clock to a global time of the master clock, synchronizing, at the validator, a time of the second slave clock to the global time of the master clock, predicting, at the validator, a timestamp to be received in an actual communication cycle from the first ECU based on the deterministic scheme of the communication standard used by the first ECU, and comparing, at the validator, the predicted timestamp with the actually received timestamp from the first ECU.

5 Claims, 2 Drawing Sheets

(56) References Cited

U.S. PATENT DOCUMENTS

| | | | |
|---|---|---|---|
| 2015/0003443 | A1 | 1/2015 | Koenigseder et al. |
| 2017/0026144 | A1 | 1/2017 | Zinner |
| 2018/0088584 | A1 | 3/2018 | Tascione et al. |
| 2018/0239664 | A1* | 8/2018 | Granig ............... G06F 11/0757 |
| 2019/0108160 | A1* | 4/2019 | Otsuka ............... G05B 19/0428 |
| 2019/0245690 | A1* | 8/2019 | Shah ...................... H04J 3/0667 |
| 2019/0294572 | A1* | 9/2019 | Rennig ............... G06F 11/0739 |
| 2019/0361736 | A1* | 11/2019 | Poledna ............... G06F 9/4881 |
| 2020/0073774 | A1* | 3/2020 | Deb ................... G06F 11/2733 |
| 2021/0160256 | A1* | 5/2021 | Banno ..................... H04L 12/40 |
| 2021/0295560 | A1* | 9/2021 | Dworakowski ...... H04N 17/002 |
| 2022/0038307 | A1* | 2/2022 | Yasunori ............. B60W 60/001 |
| 2022/0078077 | A1* | 3/2022 | Mifsud ............... G06F 9/45533 |
| 2022/0150854 | A1* | 5/2022 | Patil ........................ H04W 4/40 |
| 2023/0019817 | A1* | 1/2023 | Huang ................ H04L 63/0227 |
| 2023/0053772 | A1* | 2/2023 | Zinner .................. H04J 3/0661 |
| 2023/0076669 | A1* | 3/2023 | Acharya ................. H04W 4/44 |
| 2023/0082383 | A1* | 3/2023 | Kono ............... H04L 12/40143 712/220 |

OTHER PUBLICATIONS

Written Opinion (PCT/ISA/237) issued in PCT Application No. PCT/EP2021/073566 dated Mar. 10, 2022 (12 pages).

Extended European Search Report issued in European Application No. 20197698.2 dated Apr. 15, 2021 (18 pages).

Shreejith, S. et al., "Extensible FlexRay Communication Controller for FPGA-Based Automotive Systems", IEEE Transactions on Vehicular Technology, Feb. 1, 2015, pp. 453-465, Vo. 64, No. 2, XP011572786 (13 pages).

Shreejith, S., "Enhancing Automotive Embedded Systems with FPGAs", Nanyang Technological University, School of Computer Science and Engineering, Jan. 1, 2016, XP055597224 (249 pages).

Rieken, J. et al., "Sensor scan timing compensation in environment models for automated road vehicles", 2016 IEEE 19$^{th}$ International Conference on Intelligent Transportation Systems (ITSC), Nov. 1-4, 2016, pp. 635-642, XP033028362 (eight (8) pages).

Kim, E. et al., "SAMOP: Synchronization Avoiding Modification of Outgoing Packets in Wireless Sensor Networks", IEEE Sensors 2009 Conference, Oct. 25, 2009, pp. 560-563, XP031618712 (four (4) pages).

Bezet, O. et al., "Influence of timestamping error on data inaccuracy", 2005 7$^{th}$ International Conference on Information Fusion (FUSION), Jul. 25, 2005, vol. 1, pp. 756-763, XP010892659 (eight (8) pages).

Huck, T. et al., "Precise Timestamping and Temporal Synchronization in Multi-Sensor Fusion", 2011 IEEE Intelligent Vehicles Symposium (IV), Jun. 5-9, 2011, pp. 242-247, XP031998982 (six (6) pages).

* cited by examiner

DETERMINING CORRECTNESS OF ACTUALLY RECEIVED TIMESTAMP

BACKGROUND AND SUMMARY OF THE INVENTION

The present invention is directed to a method for determining a correctness of an actually received timestamp provided by a first ECU of a communication network using a validator, and a validator configured to carry out the method.

With an increasing complexity of autonomous or automated vehicles, multiple communication buses are used by different electronic control units (ECUs) to ensure that autonomous or automated driving functions fulfill safety requirements, e.g. requirements needed to fulfill a so-called Automotive Safety Integrity Level (ASIL).

The Automotive Safety Integrity Level is a risk classification scheme defined by ISO 26262—Functional Safety for Road Vehicles. The ASIL classification comprises five safety levels, starting from QM with the lowest safety requirements to ASIL D having the highest safety requirements.

For example, in an autonomous or automated vehicle Ethernet, CAN-FD (Controller Area Network Flexible Data-Rate) and Flexray can be used together.

Ethernet is a family of computer networking technologies commonly used in local area networks (LAN), metropolitan area networks (MAN) and wide area networks (WAN). It was commercially introduced in 1980 and first communication standardized in 1983 as IEEE (Institute of Electrical and Electronics Engineers) 802.3. Flexray is an automotive network communication protocol developed by the Flexray Consortium to govern on-board automotive computing. It is designed to be faster and more reliable than CAN (Controller Area Network) and TTP (Time Triggered Protocol). The Flexray standard is now a set of ISO standards, ISO 17458-1 to 17458-5. CAN FD is a data-communication protocol typically used for passing sensor data and control information between different parts of electronic instrumentation and a control system. This protocol is used in modern high-performance vehicles. CAN FD is an extension to the original CAN bus protocol that was specified in ISO 11898-1.

In the state of the art, time synchronization of an Ethernet bus is done according to IEEE 802.1AS for a TSN (time sensitive network) and IEEE 1588 with respect to the PTP (Precision Time Protocol). However, for time synchronization via PTP there are several measures that can be taken in addition to the respective standards, so that the integrity of the synchronization process and thus the integrity of the distributed time-base can be ensured.

However, the Flexray bus internal wall clock does not have any safety integrity and is QM. The QM criterion means that in this case the measures required by a normal quality management system (ISO/TS 16949) are sufficient. The Flexray message needs to be used with respective messages from Ethernet and CAN-FD. If Flexray messages with QM timestamps are used with the respective ASIL B or ASIL D timestamps of Ethernet (and/or CAN FD), it may result into non-fulfillment of "Freedom from Interference" functional safety requirements (ISO 26262) for highly automated vehicles according to ASIL D.

With the ISO 26262 "Freedom from Interference", it can be demonstrated that a (sub-) system with a less critical ASIL level (e.g. ASIL A) cannot influence a system with a more critical ASIL level (e.g. ASIL C). The goal is to prevent that a system with a higher error rate (e.g. ASIL A) drives a system in which a lower error rate (e.g. ASIL C) is required.

Therefore, as for autonomous and automated vehicles, one of the most complex and difficult tasks is that multiple connected communication buses and their respective ECUs need to be synchronized with each other to fulfill these requirements.

In the light of this state of the art, the object of the present invention is to provide a method for evaluating the synchronization of multiple connected communication buses and their respective ECUs with each other providing a high safety level, e.g. a safety level fulfilling ASIL D requirements, and fulfill the "Freedom from Interference" functional safety requirements according to ISO 26262.

The object is solved by the claimed invention.

More specifically, the object is solved by a method for determining a correctness of an actually received timestamp provided by a first ECU of a communication network using a validator.

The communication network comprises a master clock, the first ECU having a first slave clock, the validator having a second slave clock, and a first communication bus connecting the first ECU, the validator and the master clock to each other.

The first ECU uses a first communication standard having a deterministic scheme. That is, it is sufficient if only the connection between the first ECU and the validator has a deterministic transmission scheme. Moreover, it is possible and sufficient that the first standard has a static segment of a time cycle with a deterministic scheme.

The method for determining the correctness of the actually received timestamp at the validator, the timestamp being provided by the first ECU of the communication network, comprises synchronizing, at the first ECU, a time of the first slave clock to a global time of the master clock, synchronizing, at the validator, a time of the second slave clock to the global time of the master clock, predicting, at the validator, a timestamp to be received in an actual communication cycle from the first ECU based on the deterministic scheme of the communication standard used by the first ECU, and comparing, at the validator, the predicted timestamp with the actually received timestamp from the first ECU.

Comparing, at the validator, the predicted timestamp with the actually received timestamp provided by the first ECU of the communication network can comprise determining, at the validator, a difference between the predicted timestamp and the actually received timestamp, comparing the difference to a predefined threshold value, and if the difference is smaller than the predefined threshold value, preferably if the difference is in a certain range, determining the correctness of the actually received timestamp.

The difference between the global time of the predicted timestamp at the validator and the global time of the actually received timestamp can be determined considering a fixed delay between a data acquisition task and a data sending task of the first ECU, wherein the actually received timestamp at the validator is provided by the first ECU during the data acquisition task.

More specifically, the difference between the predicted timestamp and the actually received timestamp can be determined using the following formula:

$$GT2 - GT1 - \Delta + \delta$$

GT2 is the global time of providing the actually received timestamp by the first ECU. GT1 is a global reference time at a start of the actual communication cycle of the first ECU.

Δ is a result received by multiplying a predefined number of slots of the deterministic scheme of the first communication standard used by the first ECU with a fixed duration of the slots. δ is the fixed delay between the data acquisition task and the data sending task of the first ECU. The actually received timestamp is provided during the data acquisition task by the first ECU. Due to the deterministic behavior of the communication bus connecting the first ECU and the validator, both Δ and δ are deterministic and can be determined at pre-compile time.

Additionally or alternatively, the difference between the predicted timestamp and the actually received timestamp can be determined using the following formula:

$$GT\_Current-(GT2+\delta)$$

GT2 is the global time of providing the actually received timestamp by the first ECU. δ is the fixed delay between the data acquisition task and the data sending task of the first ECU. The actually received timestamp is provided during the data acquisition task by the first ECU. GT_Current is a global time of receiving the actually received timestamp at the validator.

In general, this approach does not provide the same accuracy level as the previous procedure due to a software interrupt latency ε upon querying the current global time at the time the PDU carrying a timestamp that needs to be validated is received (i.e. GT_Current). In addition, this solution requires typically more computing resources. However, it is simpler from the fact that only one deterministic parameter δ must be provided.

The global time of the actually received timestamp can be determined at the first ECU using the following formula:

$$GT2=GT1+lt2-lt1$$

GT2 is the global time of providing the actually received timestamp by the first ECU. GT1 is a global reference time at a start of the actual communication cycle of the first ECU. lt1 is a local time of the first slave clock of the first ECU at the start of the actual communication cycle. lt2 is a local time of the first slave clock of the first ECU at the time of providing the actually received time stamp by the first ECU.

The communication network can further comprise a second ECU having a third slave clock, a gateway ECU comprising the validator, and a second communication bus connecting the second ECU via the gateway ECU and the first communication bus to the first ECU.

The second ECU can use a second communication standard having a higher safety integrity level than the first communication standard used by the first ECU or be validated by other methods.

An integrity of the master clock can be sufficient to fulfill safety requirements of the second communication standard having the higher safety integrity level than the first communication standard.

The correctness of the actually received timestamp provided by the first ECU can be determined by the validator according to the safety requirements of the second communication standard.

Synchronizing, at the first ECU, the time of the first slave clock to the global time of the master clock can comprise receiving, at the first ECU, a synchronization message from the master clock such that the time of the first slave clock of the first ECU is synchronized to the global time of the master clock based on the received synchronization message.

Furthermore, a validator can be provided. The validator can be configured to determine a correctness of an actually received timestamp provided by a first ECU of a communication network.

The communication network can comprise a master clock, the first ECU having a first slave clock, and a first communication bus being configured to connect the first ECU, the validator and the master clock to each other.

The first ECU can use a first communication standard having a deterministic scheme. A time of the first slave clock can be synchronized to a global time of the master clock.

The validator can comprise a second slave clock, wherein a time of the second slave clock is synchronized to the global time of the master clock.

The validator can be configured to predict a timestamp to be received in an actual communication cycle from the first ECU based on the deterministic scheme of the communication standard used by the first ECU, and compare the predicted timestamp with an actually received timestamp from the first ECU.

The above described with reference to the method also applies to the device, i.e. the validator, and vice versa.

Moreover, the validator can be configured to carry out one of the above described methods.

In short, by comparing and predicting the timestamp of the first ECU, the validator ensures that time synchronization of the first ECU may achieve a highest possible level of safety integrity according to the safety integrity of the validator. Furthermore, it is ensured that the safety integrity level of the second ECU and the second communication bus will be inherited by the validator and it is ensured that the safety integrity level of the first ECU with the first communication bus, the validator with the gateway ECU and the second ECU with the second communication bus achieve similar and/or the highest possible safety integrity level.

In the following, a description of an embodiment of the present invention is given with respect to FIGS. 1 to 3.

DETAILED DESCRIPTION OF THE DRAWINGS

Figure 1:
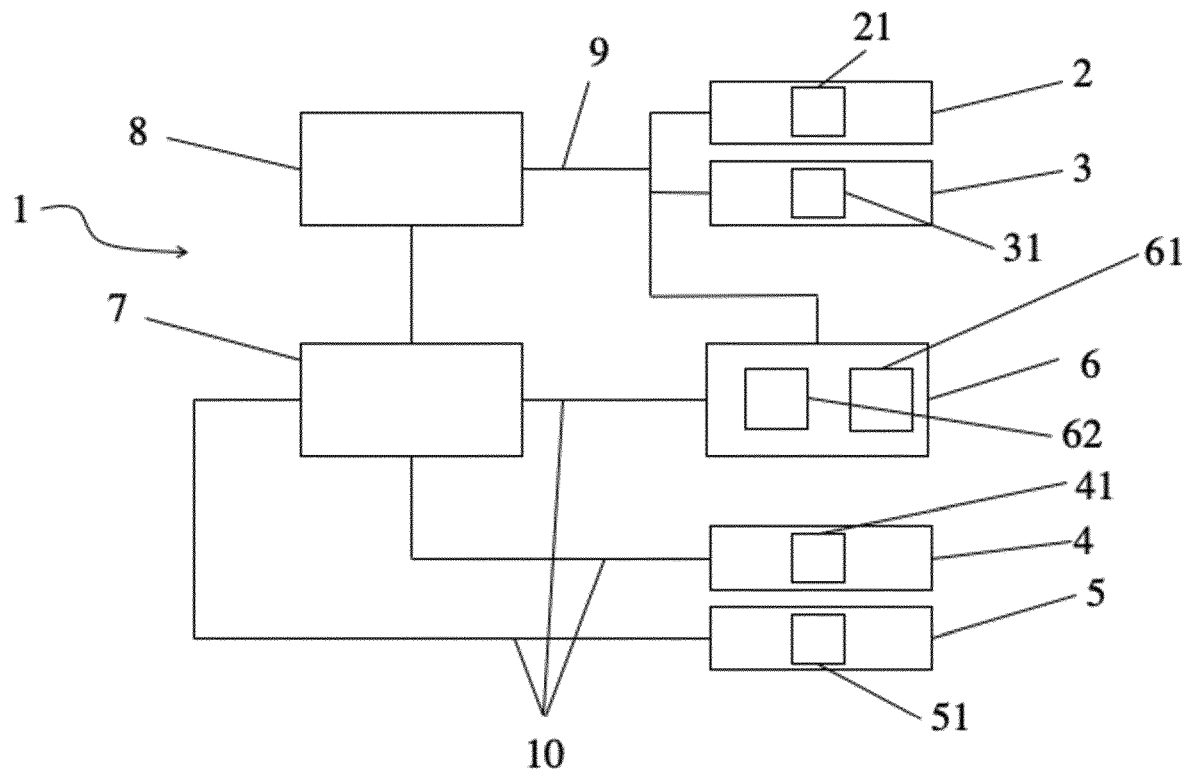
FIG. 1 depicts schematically a communication network with multiple communication buses used in a vehicle.

The communication network 1 shown in FIG. 1 is a network for transmitting data in an autonomous or automated vehicle, e.g. a car.

The network 1 comprises two ECUs 2, 3 using a first communication standard, two ECUs 4, 5 using a second communication standard, a gateway ECU 6, an interconnect 7, a master clock 8, a first bus system (i.e. first communication bus) 9 using the first communication standard, and a second bus system (i.e. second communication bus) 10 using the second communication standard.

More specifically, the network 1 comprises a first and a second ECU 2, 3 using a first deterministic communication standard, e.g. a Flexray standard as defined in the entry part of the description, a third and a fourth ECU 4, 5 using a second communication standard, e.g. an Ethernet standard (or CAN FD, in the following Ethernet will be used as example for the second communication standard, wherein it is also possible to use CAN FD) as defined in the entry part of the description, and the gateway ECU 6.

The first and the second ECU 2, 3 are connected by the first bus system 9 to the master clock 8, respectively. Moreover, the first and the second ECU 2, 3 are also connected to the gateway ECU 6 via the first bus system 9, respectively. The first bus system 9 uses the first communication standard. In the above example, the first bus system 9 would be a deterministic Flexray bus system.

The third and the fourth ECU 4, 5 are connected to the interconnect 7 via the second bus system 10, respectively, wherein the second bus system 10 uses the second communication standard. In the above example, the second bus system 10 would be an Ethernet bus system. Moreover, the third and the fourth ECU 4, 5 are also connected by the second bus system 10 to the gateway ECU 6 via the interconnect 7, respectively.

The interconnect 7, which would be an Ethernet interconnect (e.g. a switch) in the above example, is configured to connect the third and the fourth ECU 4, 5 of the network 1 to the gateway ECU 6, respectively, by using packet switching to receive data from and/or forward data to the gateway ECU 6.

The master clock 8 is connected to the first bus system 9 and to the second bus system 10 via the interconnect 7. The master clock 8 is configured to provide a global or master time to the ECUs 2, 3, 4, 5 each comprising a slave clock 21, 31, 41, 51 as well as to the gateway ECU 6 also comprising a slave clock 61. The master clock 8 is thus configured to provide timing signals to synchronize the slave clocks 21, 31, 41, 51, 61 of the devices 2, 3, 6 using the first communication standard and the devices 4, 5, 6 using the second communication standard of the network 1.

The gateway ECU 6, which would be a Flexray-Ethernet gateway ECU in the above example, is configured to provide interoperability between the first and the second ECU 2, 3 using the first communication standard, here the Flexray standard, and the third and the fourth ECU 4, 5 using the second communication standard, here the Ethernet standard. Therefore, the gateway ECU 6 is configured to do unidirectional or bidirectional protocol translation between the first and the second communication standard.

In the present case, the second communication standard has a higher safety integrity level than the first communication standard. For example, the Ethernet standard used by the third and the fourth ECU 4, 5 can be ASIL D qualified, whereas the Flexray standard used by the first and the second ECU 2, 3 is solely QM.

As explained above, via the gateway ECU 6 the first and the second ECU 2, 3 and the third and the fourth ECU 4, 5 can communicate with each other. However, since they use communication standards with different safety integrity levels, this is not possible according to a "Freedom from Interference" functional safety requirements (ISO 26262) for highly automated vehicles according to ASIL D.

As explained in the entry part of the description, with the ISO 26262 "Freedom from Interference" criterion, it can be demonstrated that a (sub-) system with a less critical ASIL level, here the first bus system 9 with the first and the second ECU 2, 3, cannot influence a system with a more critical ASIL level, here the second bus system 10 with the third and the fourth ECU 4, 5 and the interconnect 7. The goal is to prevent that a system with a higher error rate drives a system in which a lower error rate is required.

Therefore, the method for determining the correctness of the actually received timestamp provided by the first and the second ECU 2, 3 of the communication network 1 is provided. That is, the timestamps provided by the first and the second ECU 2, 3 can be qualified to a higher safety level, here ASIL D, by the gateway ECU 6.

Therefore, the gateway ECU 6 comprises a validator 62, in the present case a central validator, being configured to carry out the method.

Figure 2:
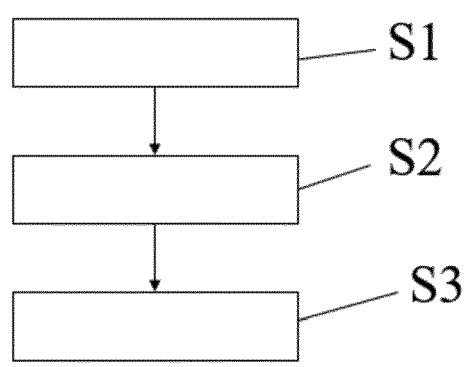
FIG. 2 depicts schematically a flow chart of a method for determining a correctness of an actually received timestamp provided by a first ECU of the communication network of FIG. 1 using a validator.
Figure 3:
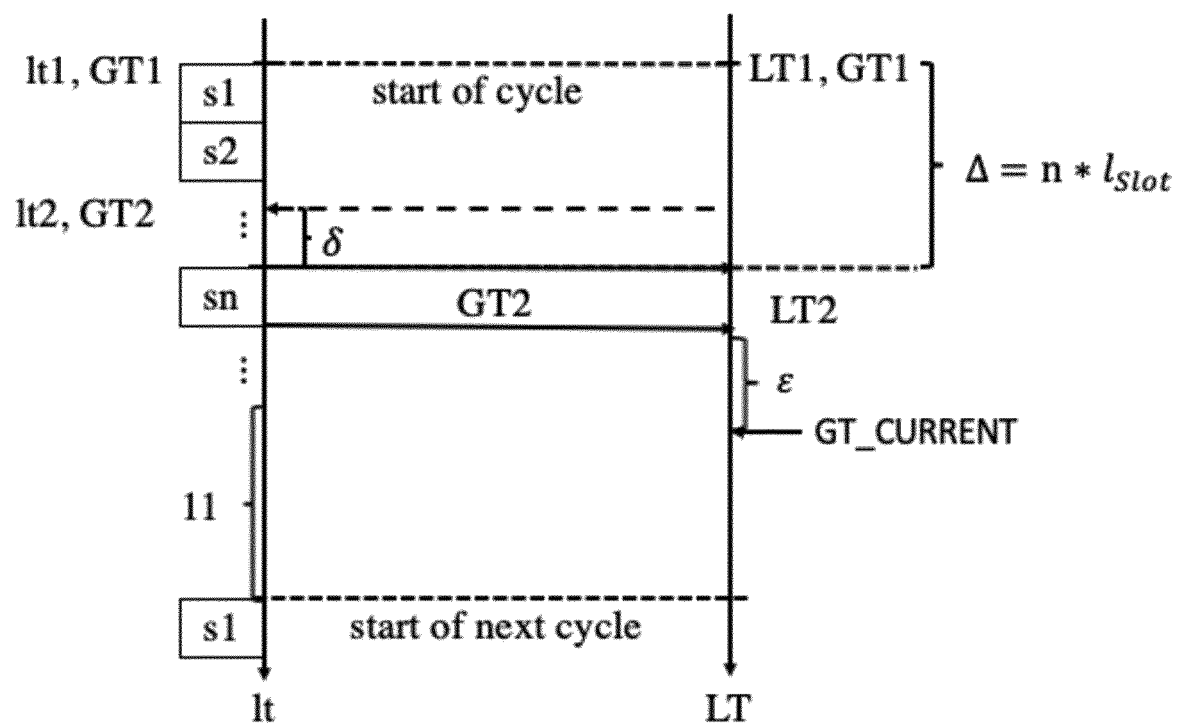
FIG. 3 depicts schematically a communication scheme of the first ECU and the validator of FIG. 1.

In the following the method will be described in detail with respect to FIGS. 2 and 3. FIG. 2 shows a flowchart depicting steps of the method. FIG. 3 depicts schematically a communication scheme of the first ECU 2 with the validator 62 on the gateway ECU 6 using the first communication standard and a first and a second possibility for determining the correctness of the actually received timestamp.

As explained above, the communication network 1 comprises the master clock 8, the ECUs 2, 3, 4, 5 having the slave clocks 21, 31, 41, 51, respectively, the validator 6 having the slave clock 61, and the validator 62, and the first communication bus system 9 connecting the first and the second ECU 2, 3, the validator 62 and the master clock 8 to each other.

The first communication standard used by the first and the second ECU 2,3 has a deterministic scheme. That is, the underlying communication protocol always passes through the same sequence of states at a predefined and fixed time. Thus, it is possible to predict when a data packet sent from the first or the second ECU 2, 3 using the first communication standard will arrive at a receiver, here at the validator 62 of the gateway ECU 6.

In case the Flexray standard is used, the communication on the first bus system 9 runs in cycles. Each of these cycles is divided into different segments including a static and a dynamic segment.

In the static segment, each ECU 2, 3 using the first communication standard has its specific slot, i.e. time window, in which it can send messages. It must not exceed the length of its slot. If the message is too long, another cycle that is assigned to the respective ECU or the dynamic segment must be used to continue the message.

This is the deterministic part of the protocol, i.e. of the first communication standard, that ensures that important messages, e.g. steering, brake and so on, are transmitted within a known time.

To predict, when a data packet will arrive at the validator 62, in a first step S1 of the method, a time of the slave clocks 21, 31, 41, 51, 61 of the ECUs 2, 3, 4, 5 and the gateway ECU 6 is synchronized to a global time of the master clock 8, respectively.

Synchronizing, at the first and the second ECU 2, 3, the time of the respective slave clocks 21, 31 to the global time of the master clock 8 can comprise receiving, at the first and the second ECU 2, 3, respectively, a synchronization message from the master clock 8 such that the local time of the respective slave clocks 21, 31 of the first and the second ECU 2, 3 are synchronized to the global time of the master clock 8 based on the received synchronization message.

In a second step S2, the validator 62 predicts a timestamp to be received in an actual communication cycle from the first and/or the second ECU 2, 3 based on the deterministic scheme of the first communication standard used by the first and the second ECU 2, 3.

Afterwards, in a third step S3, the validator 62 compares the predicted timestamp with the actually received timestamp from the first and/or the second ECU 2, 3.

The steps S1 to S3 will now be explained in detail with reference to FIG. 3.

As explained above, in FIG. 3 two possibilities for determining the correctness of the actually received timestamp are shown. The two possibilities of determining the correctness of the timestamp can be used alternatively or in combination.

However, according to both possibilities, the third step S3 of comparing, at the validator 62, the predicted timestamp with the actually received timestamp comprises determining, at the validator 62, a difference between the predicted timestamp and the actually received timestamp, comparing the difference to a predefined threshold value, and if the difference is smaller than the predefined threshold value, preferably if the difference is in a certain range, determining the correctness of the actually received timestamp by a validation marking, where an integrity flag is set, or any other mean that is transparent to the receiver of the information.

More specifically, in FIG. 3 two timelines are shown. On the left side of FIG. 3 a timeline for the first ECU 1, on which the local time lt of the slave clock 21 of the first ECU 1 is depicted, and on the right side of FIG. 3 a time line for the validator 62, on which the local time LT of the slave clock 61 of the gateway ECU 6 is depicted, are shown.

Every synchronized ECU 2, 3, 4, 5, 6 has after synchronization the same global time available typically referred to a local instance of global time, i.e. a local clock, derived from its underlying local hardware counter, e.g. an oscillator, that maintains the synchronized time or global time, respectively. This implies that synchronized slave clocks 21, 31, 41, 51, 61 are bounded to global time of the master clock 8.

Upon synchronization a reference-tuple lt1, GT1, LT1, GT1 is generated that contains the local time lt1, LT1, and the corresponding synchronized time GT1. This reference tuple lt1, GT1, LT1, GT1 is used to derive the current synchronized time at any desired point in time.

Thus, in the present case, the first step S1 of synchronizing the slave clocks 21, 31, 41, 51, 61 generates merely a reference that can be used to translate from local time lt, LT to the synchronized or global time GT.

For the first ECU 2, the current synchronized time GT2 at the current local time lt2 with lt2>lt1 is given by:

$$GT2=GT1+lt2-lt1$$

GT2 can be the global time of providing the actually received timestamp read from the local slave clock 21 by the first ECU 2 to the measured data. GT1 can be the global time at the start of the actual communication cycle of the first ECU 2. lt1 can be a local time of the slave clock 21 of the first ECU 2 at the start of the actual communication cycle. lt2 can be a local time of the slave clock 21 of the first ECU 2 at the time of providing the actually received time stamp by the first ECU 2.

Analogously, for the gateway ECU 6 and thus for the validator 62, the current synchronized time GT2 at the current local time LT2 with LT2>LT1 is given by:

$$GT2=GT1+LT2-LT1$$

Moreover, the communication scheme of the first communication standard comprises, as explained above, a deterministic or static part comprising slots s1-sn, wherein each slot has a fixed and predefined duration, and an indeterministic or dynamic part 11.

During a data acquisition task of the first ECU 2 a timestamp, i.e. the actually received timestamp originating from the local instance of global time, is attached to data sent in the static part of the data acquisition task and then send during a data sending task from the first ECU 2 via the first bus system 9 to the gateway ECU 6.

Between the data sending and the data acquisition task a fixed delay $\delta$ is provided according to the first communication standard.

Therefore, the difference between the global time of the predicted timestamp and the global time of the actually received timestamp can be determined considering the fixed delay $\delta$ between the data acquisition task and the data sending task of the first ECU 2, wherein the timestamp actually received by the validator 62 for validation purpose is provided during the data acquisition task by the first ECU 2. This is true for both possibilities for determining the correctness of the actually provided timestamp.

More specifically, according to the first possibility, the difference between the predicted timestamp and the actually received timestamp can be determined using the following formula:

$$GT2-GT1-\Delta+\delta$$

GT2 is the global time of providing the actually received timestamp by the first ECU 2. GT1 is a global reference time. In the present embodiment, GT1 is a global time at a start of the actual communication cycle of the first ECU 2. $\Delta$ is a result received by multiplying a predefined number of slots n of the deterministic scheme of the first communication standard used by the first ECU 2 with a fixed duration of the slots $l_{Slot}$. It takes the scheduling of the messages into account, such that GT1+$\Delta$ corresponds to the instance in global time when the message is scheduled for transmission by the first ECU 2. As explained above, $\delta$ is the fixed delay between the data acquisition task and the data sending task of the first ECU 2. The actually received timestamp is provided during the data acquisition task by the first ECU 2. Therefore, GT2-$\delta$ corresponds to the instance in global time when the message is scheduled for transmission by the first ECU 2. The formula makes use of this fact by comparing both instances in time to each other. Thereby, the integrity of the timestamp can be checked.

During the data acquisition task, the first ECU 2 can acquire data from an external unit, e.g. a sensor, and add the actually received timestamp to the acquired data. The timestamp being substantially the global time at which the data was acquired from the first ECU 2.

During the data sending task, the data acquired during the data acquisition task plus the added actually received timestamp are sent from the first ECU 2 to the validator 62.

The validator then calculates the difference with the above formula and compares the difference with a predefined threshold value. If the difference is smaller than the defined threshold value, i.e. a jitter of the first ECU 2 is smaller than the threshold value, the validator 62 demines the actually provided timestamp of the first ECU 2 to be correct, i.e. to fulfill the safety requirements of the second communication standard. Therefore, the validator 62 is configured to qualify the actually received timestamps to the safety level of the second communication standard, here ASIL D.

Additionally or alternatively, according to the second possibility, the difference between the predicted timestamp and the actually received timestamp can be determined using the following formula:

$$GT\_Current-(GT2+\delta)$$

As explained above, GT2 is the global time of providing the actually received timestamp by the first ECU 2 and $\delta$ is the fixed delay between the data acquisition task and the data sending task of the first ECU 2. The actually received timestamp is provided during the data acquisition task. GT_Current is a global time of receiving the actually received timestamp at the validator 62. From a conceptual point of view the two solutions are identical, however, they may differ from implementation effort and achievable reliability of a certain accuracy-level.

Analogously to the first possibility, the thus received difference is compared by the validator 62 with a predefined threshold value, here the uncertainty ε, and if the difference is smaller the threshold value, i.e. a jitter of the first ECU 2 is smaller than the threshold value, the validator 62 demines the actually provided timestamp of the first ECU 2 to be correct, i.e. to fulfill the safety requirements of the second communication standard. Therefore, the validator 62 is configured to qualify the actually received timestamps to the safety level of the second communication standard, here ASIL D.

Since an integrity of the master clock 8 is sufficient to fulfill safety requirements of the second communication standard having the higher safety level than the first communication standard, the correctness of the actually received timestamp can be determined by the validator 62 according to the safety requirements of the second communication standard.

The above explanation given with respect to FIG. 3 concerning the first ECU 2 is also valid for the second ECU 3, and if more than two ECUs 2, 3 are provided using the first communication standard, also for these ECUs.

In summary, according to the above described embodiment the Flexray bus 9 receives a synchronization message from the grandmaster 8. The Flexray bus 9 is internally synchronized based on the given synchronization message. The Ethernet communication bus 10 provides synchronization via IEEE802.1 AS or similar protocols with ASIL D for the central validator 62. The central validator 62 on the gateway ECU 6 works as a comparator between the Ethernet communication bus 9 and the Flexray communication bus 10, that compares received timestamps to the expected values for those timestamps. The central validator 62 on one side ensures that the Ethernet communication is verified according to ASIL D and on the other hand takes QM input from the Flexray bus 9 and validates it with the clock of the Ethernet. As the Flexray bus 9 is deterministic in nature hence the central validator 62 use the deterministic scheduling of the Flexray messages to verify the correctness of the Flexray timestamps provided as QM, and qualify the given timestamps to ASIL D. The gateway ECU 6, here the validator 62, can predict the timestamps which might be coming in next cycle from the Flexray bus 9. The prediction of timestamps is done based on the deterministic static message data including the fixed delay between data acquisition task and data sending task of the Flexray standard. Hence the predicted timestamps are compared to the received time stamps to ensure the jitter in the Flexray communication bus 9 is not greater than highly automated vehicle time synchronization threshold, i.e. 1 ms.

REFERENCE SIGNS LIST 1 communication network
2, 3 ECU using a first communication standard
4, 5 ECU using a second communication standard
6 gateway ECU with validator
7 interconnect, e.g. a switch
8 time grand master/master clock
9 first bus system using the first communication standard
10 second bus system using the second communication standard
11 indeterministic part of first communication standard
21 slave clock of first ECU
31 slave clock of second ECU
41 slave clock of third ECU
51 slave clock of fourth ECU
61 slave clock of validator
62 validator
GT global time
GT1 global time at start of cycle
GT2 global time at providing/adding actually received timestamp
GT_current global time of receiving actually received timestamp at validator
lt local time at first ECU
lt1 local time at start of cycle at first ECU
lt2 local time at providing/adding actually received timestamp at first ECU
LT local time at gateway ECU
LT1 local time at start of cycle at gateway ECU
LT2 local time at gateway ECU of receiving timestamp at the validator
$l_{Slot}$ duration of one slot of first communication standard
n number of slots
Δ result received by multiplying n with $l_{Slot}$
δ fixed delay between data acquisition task and data sending task
S1-S1 steps of the method

The invention claimed is:

1. A method for determining a correctness of an actually received timestamp provided by a first ECU of a communication network of a vehicle using a validator,
   wherein the communication network comprises a master clock, the first ECU having a first slave clock, the validator having a second slave clock, and a first communication bus connecting the first ECU, the validator and the master clock to each other, and wherein the first ECU uses a first communication standard having a deterministic scheme,
   the method comprising:
   synchronizing, at the first ECU, a first time of the first slave clock to a global time of the master clock,
   synchronizing, at the validator, a second time of the second slave clock to the global time of the master clock,
   predicting, at the validator, a timestamp to be received in an actual communication cycle from the first ECU based on the deterministic scheme of the communication standard used by the first ECU, and
   comparing, at the validator, the predicted timestamp with the actually received timestamp from the first ECU,
   wherein the comparing, at the validator, the predicted timestamp with the actually received timestamp provided by the first ECU of the communication network comprises:
   determining, at the validator, a difference between the predicted timestamp and the actually received timestamp,
   comparing the difference to a predefined threshold value, and
   upon determining that the difference is smaller than the predefined threshold value, determining the correctness of the actually received timestamp, wherein:
   the difference between the global time of the predicted timestamp at the validator and the global time of the actually received timestamp is determined considering a fixed delay between a data acquisition task and a data sending task of the first ECU, the actually received timestamp at the validator is provided by the first ECU during the data acquisition task, and the difference between the predicted timestamp and the actually received timestamp is determined using the following formula:

GT2−GT1−Δ+δ, wherein:

GT2 is a global time of providing the actually received timestamp by the first ECU, GT1 is a global reference time at a start of the actual communication cycle of the first ECU, Δ is a result received by multiplying a predefined number of slots of the deterministic scheme of the first communication standard used by the first ECU with a fixed duration of the slots, and δ is the fixed delay between the data acquisition task and the data sending task of the fir st ECU, wherein the actually received timestamp is provided during the data acquisition task by the first ECU.

2. The method according to claim 1, wherein the global time of the actually received timestamp is determined at the first ECU using the following formula:

GT2=GT1+lt2−lt1 wherein:

lt1 is a local time of the first slave clock at the start of the actual communication cycle, and lt2 is a local time of the first slave clock at the time of providing the actually received time stamp by the first ECU.

3. The method according to claim 1, wherein:

the communication network further comprises a second ECU having a third slave clock, a gateway ECU comprising the validator, and a second communication bus connecting the second ECU via the gateway ECU and the first communication bus to the first ECU, the second ECU uses a second communication standard having a higher safety integrity level than the first communication standard used by the first ECU, an integrity of the master clock according to the validator is sufficient to fulfill safety requirements of the second communication standard having the higher safety integrity level than the first communication standard, and the validator determines the correctness of the actually received timestamp provided by the first ECU according to the safety requirements of the second communication standard.

4. The method according to claim 3, wherein the synchronizing, at the first ECU, the first time of the first slave clock to the global time of the master clock comprises:

receiving, at the first ECU, a synchronization message from the master clock such that the first time of the first slave clock of the first ECU is synchronized to the global time of the master clock based on the received synchronization message.

5. A validator configured to determine a correctness of an actually received timestamp provided by a first ECU of a communication network of a vehicle, wherein the communication network comprises a master clock, the first ECU having a first slave clock, and a first communication bus configured to connect the first ECU, the validator and the master clock to each other, wherein the first ECU uses a first communication standard having a deterministic scheme, and wherein a first time of the first slave clock is synchronized to a global time of the master clock, the validator comprising:

a second slave clock, wherein a second time of the second slave clock is synchronized to the global time of the master clock, and wherein the validator is configured to:

predict a timestamp to be received in an actual communication cycle from the first ECU based on the deterministic scheme of the communication standard used by the first ECU, and compare the predicted timestamp with an actually received timestamp from the first ECU, wherein to compare the predicted timestamp with the actually received timestamp from the first ECU, the validator is further configured to:

determine a difference between the predicted timestamp and the actually received time stamp, compare the difference to a predefined threshold value, and upon determining that the difference is smaller than the predefined threshold value, determine the correctness of the actually received timestamp wherein:

the difference between the global time of the predicted timestamp at the validator and the global time of the actually received timestamp is determined considering a fixed delay between a data acquisition task and a data sending task of the first ECU, the actually received timestamp at the validator is provided by the first ECU during the data acquisition task, and the difference between the predicted timestamp and the actually received timestamp is determined using the following formula:

GT2−GT1−Δ+δ, wherein:

GT2 is a global time of providing the actually received timestamp by the first ECU, GT1 is a global reference time at a start of the actual communication cycle of the first ECU, Δ is a result received by multiplying a predefined number of slots of the deterministic scheme of the first communication standard used by the first ECU with a fixed duration of the slots, and δ is the fixed delay between the data acquisition task and the data sending task of the first ECU, wherein the actually received timestamp is provided during the data acquisition task by the first ECU.

* * * * *